No. 829,384. PATENTED AUG. 28, 1906.
J. P. BRENNAN.
POTATO HARVESTER.
APPLICATION FILED OCT. 20, 1904.
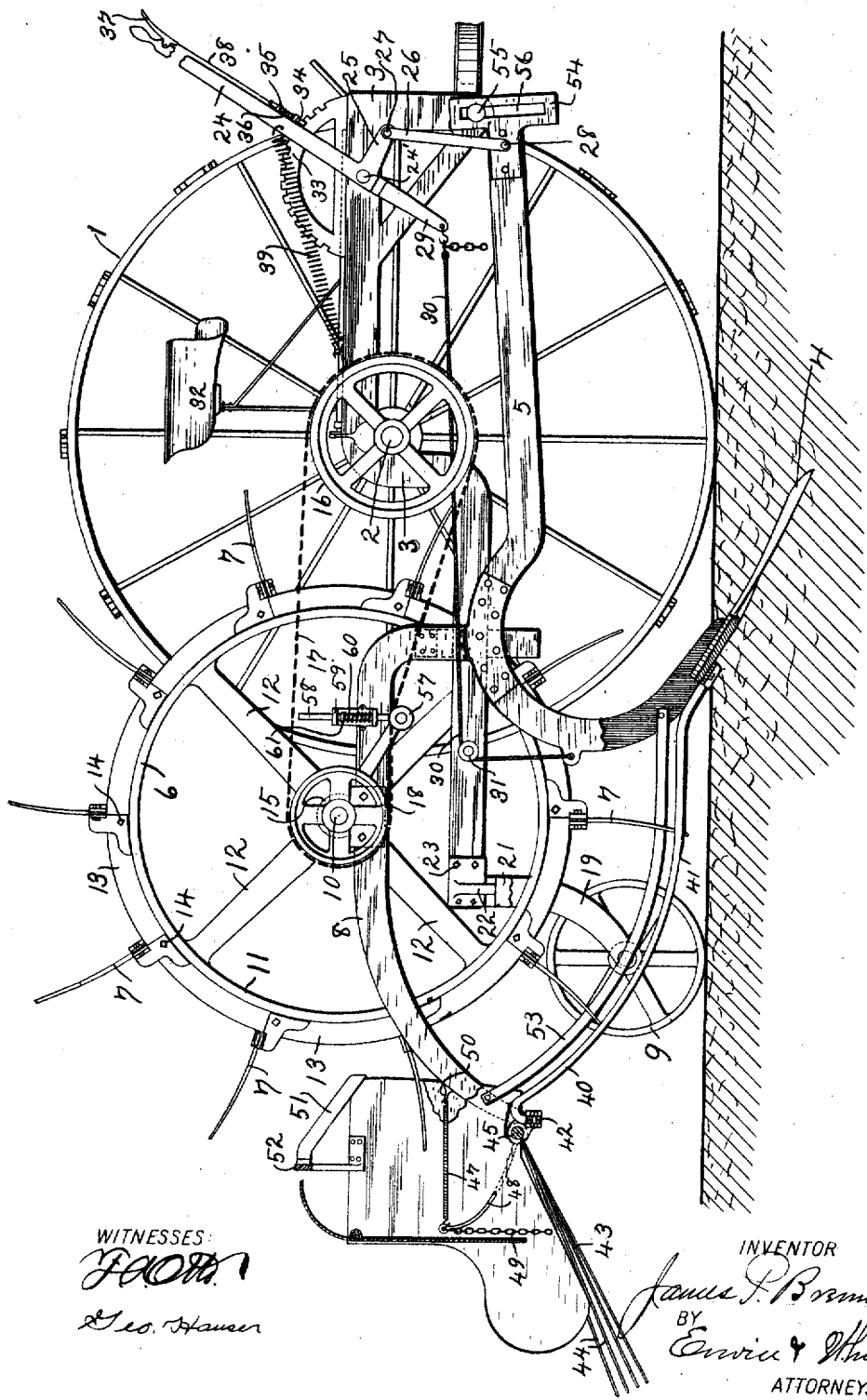
WITNESSES
INVENTOR
James P. Brennan
BY
ATTORNEYS.

UNITED STATES PATENT OFFICE.

JAMES P. BRENNAN, OF COLUMBUS, WISCONSIN.

POTATO-HARVESTER.

No. 829,384.　　　　Specification of Letters Patent.　　　　Patented Aug. 28, 1906.

Application filed October 20, 1904. Serial No. 229,225.

*To all whom it may concern:*

Be it known that I, JAMES P. BRENNAN, a citizen of the United States, residing at Columbus, county of Columbia, and State of Wisconsin, have invented new and useful Improvements in Potato-Harvesters, of which the following is a specification.

My invention relates to improvements in that class of potato-harvesters for which Letters Patent No. 616,885, issued to me on the 3d day of January, 1899; and it pertains more especially to certain details of construction hereinafter explained, reference being made to the accompanying drawing, which represents a side view thereof.

Like parts are identified by the same reference characters throughout the view.

My potato-harvester comprises, among other things, the traction-wheels 1 1, wheel-connecting axle 2, axle-supported frame 3, potato-excavating blade 4, blade-supporting beam 5, reel 6, provided with radial arms 7, reel-supporting arms 8, frame-supporting wheels 9, and mechanism for raising and adjusting the excavating-blade and the blade-supporting beam, together with the parts connected therewith. My potato-reel 6 comprises the central shaft 10, which is supported at its respective ends from the arms 8 in journal-bearings 15 and annular rim 11, which is supported from the shaft 10 by the radial arms or spokes 12. The annular rim 11 is provided with a radial flange 13, to which a plurality of radial arms 7 are connected by bolts 14. It is obvious that by the construction shown a greater or less number of radial arms may in like manner be secured to the reel, as desired. Motion is communicated from the traction-wheel 1 to the reel 6 through the axle 2, sprocket-wheel 16, sprocket-chain 17, sprocket-wheel 18, and reel-supporting shaft 10. The frame 3 is supported at its front end from the axle 2 and at its rear end from the traction-wheels 9. The wheels 9 are connected with the frame 3 through the yokes 19, suitable trunnions, collar 21, and bracket 22, the bracket 22 being connected with the frame by a plurality of bolts 23. It will be understood that by this arrangement the wheels 9 serve as casters and are free to turn upon their trunnions as the direction of the harvester is changed. 24 is a three-armed hoisting-lever by which the beams 5 and the parts connected therewith are raised and adjusted at any desired elevation, motion being communicated from the lever 24 to both the front and rear ends of both of the beams at the same time, motion being communicated directly to the front end of one of said beams from the lever 24 through the arm 25, link 26, bolts 27 and 28 and to the rear end of said beam through the arm 29, cable 30, and cable-supporting pulley 31, while motion is communicated in like manner to the other beam 5 through similar arms and cable on the opposite side of the frame through the transversely-arranged shaft 24', whereby both ends of both beams are simultaneously raised and lowered by the movement of said lever 24. The cables 30 are supported above the rear ends of the beams upon the pulleys 31. Thus it will be obvious that as the lever 24 is drawn rearwardly from the position shown toward the operator's seat 32 said beams 5 will be raised and the excavating-blade 4 removed from the soil, when the harvester may be drawn like an ordinary vehicle over the ground. When, however, it is desired to use the harvester, the beams and excavating-blade are lowered by throwing the lever 24 forwardly to the position shown.

It will also be obvious that the blade 4 may be adjusted to penetrate the earth at greater or less depths, as may be required for different work, by changing the adjustment of the lever 24 to the lever-retaining ratchet at 33. The ratchet 33 is supported on the frame 3. The lever 24 is locked at any desired point of adjustment with the teeth of the ratchet by the ordinary locking mechanism used for such purposes consisting of the sliding pawl 34, pawl-supporting bracket 35, pawl-actuating spring 36, hand-actuating bracket 37, pivotally connected with said lever and connecting-rod 38.

To facilitate raising the beam and the parts connected therewith, I preferably connect the upper arm of the operating-lever 24 with the stationary part of the frame 3 by a spiral spring 39. It will be understood that as said beam and connecting parts are lowered said spring will be drawn out and put under tension and that when desired to raise the beam and connecting parts a portion of its gravity will be counterbalanced by the recoil of said spring, whereby the same may be raised with greater ease. 40 is a screen which is made up of a plurality of longitudinal bars 41, which are connected at their rear ends with the rear ends of the arms 8 through the transversely-arranged bars 42 and at their front ends with the rear end of the excavating-blade 4 in any convenient manner, the screen 40 being so arranged that as the potatoes, with the surrounding soil, are raised by the excavating-blade they will be deposited thereon, when the dirt is screened out between the bars 41, while the potatoes are carried rearwardly and upwardly over the rear end of the screen 40 by the action of the radial arms 7 of the reel, the radial arms 7 being adapted to enter the spaces between the bars 41 of the screen as they are carried rearwardly by the revolving movement of the reel, whereby the potatoes are elevated, as stated, and deposited upon the reversely-inclined screen 43, from which they pass of their own gravity to the ground. The screen 43 is made up of a plurality of fingers 44, which are rigidly connected at their upper ends to the transversely-arranged bar 45, which bar 45 is pivotally connected at its respective ends to the rear ends of said arms 8. The rear end of the screen 43 is suspended at a slight distance above the ground through the spiral springs 47 and radial arm 48. The arm 48 is rigidly connected at its lower end to the shaft 45. Thus it is obvious that as the harvester moves upwardly and downwardly over a rough surface the rear end of said screen 43 will be thrown downwardly by its gravity and drawn upwardly by the recoil of the spring 47 and be thus caused to vibrate rapidly upwardly and downwardly, whereby the dirt is more effectually separated from the potatoes as they are passing over the screen. 49 is a flexible connection which serves to hold the screen 43 in an elevated position when the harvester is not in use, and when thus used the free end of the chain is engaged in the hook 50.

To prevent the potato-vines, weeds, and similar material which may be caught by the radial arms 7 of the reel from being carried over the reel and thrown forwardly upon the machine, I have provided a series of bars 51, which are supported from bar 52. It will be understood that such vines and refuse material as are carried upwardly by the radial arms 7 will be caught, broken, and disengaged therefrom by the bars 51.

53 represents side bars by which the potatoes are prevented from being shaken from the side of the screen as they are being elevated. The front ends of the beams 5 are connected with the main frame 3 through the slidable bracket 54 and bolt 55, which bolt operates in a vertical recess 56, formed in said bracket.

Heretofore it has been common to connect the front ends of the beams of the excavating-blade at a fixed point to the main frame, whereby the rear portion of the beams is swung upwardly without raising the front end.

It will be obvious that by the construction shown I am enabled to raise and lower both the front and rear ends of the beam and connecting parts vertically at the same time. By this arrangement it will be understood that I am enabled to change the depth of the excavating-blade in the soil without changing its inclination to the surface of the ground, which is a very important object to attain.

57 is an idler-pulley, by which the slack in the sprocket-chain 17 is regulated as the reel and reel-supporting frame are raised. The pulley 57 is revolubly supported from the vertical bar 58, which bar 58 is slidably supported in the bracket 59, said bar 58 being thrown up by the recoil of the spiral spring 60. The spiral spring 60 bears at its lower end against the lower end of the bracket 59 and at its upper end against the pin 61, which pin 61 is rigidly connected with the bar 58, whereby said bar 58 is thrown upwardly by the recoil of the spring while the spring is compressed by the downward pressure of the sprocket-chain 17 upon the pulley 57.

It will now be understood that by the peculiar mechanism shown and described for connecting the front end of the beam 5 with the main frame of the machine both by the draw-bolt 55, which operates in the vertical slot in the bracket 54, and by the link 26 and operating-handle 24 I am able to not only raise, lower, and adjust both ends of the beam simultaneously without changing the inclination of the beam to the surface of the ground, but it is also a fact that when the operating-handle 24 is locked at any desired point on the rack-bar the front end of the beam will be held in place by the link 26 and cannot rise and fall, as it might otherwise do with the rear end of the beam as the excavating-plate is drawn over uneven surfaces. It therefore follows that when the operating-handle is locked the rear end of the beam is free to rise and fall as the excavating-plate is drawn over uneven surfaces, thereby describing a partial circle around the draw-bolt, while the front end remains in the same relative position to such draw-bolt; but when the operating-handle is moved backwardly and forwardly said beam and the other parts supported therefrom will be raised and lowered bodily.

Having thus described my invention, what I claim as new, and desire to secure by Letters Patent, is—

1. In a potato-harvester the combination with the beam of the excavating-blade of means for slidably connecting the front end of said beam by a fixed pivot to the beam-supporting frame, beam-supporting frame, means for raising and lowering both the front and rear ends of said beam simultaneously by the manual act of the operator, means for retaining the front end of the beam at substantially a fixed point upon said pivot as the rear end of the beam is raised and lowered by contact of the excavating-blade with uneven surfaces.

2. In a potato-harvester the combination with the main frame and reel, screen, and blade-supporting beam, of means for slidably connecting the front end of said beam by a fixed pivotal draw-bolt to said frame, means for communicating a vertical movement to both the front and rear ends of the beam simultaneously, by the manual act of the operator, such means consisting of a three-armed lever pivotally supported from said frame, a flexible connection communicating from one of the arms of said lever over bearings with the rear end of said beam, and a link communicating from another arm of said lever to the front end of said beam, said link being adapted to serve the twofold purpose of communicating motion from the hand-actuated lever to the beam as said lever is moved and of holding the front end of said beam at a substantially fixed point relatively to said retaining-pivot when said operating-lever is at rest.

3. In a potato-harvester the combination of a main supporting-frame 3, operating-lever 24 pivotally supported from said frame, blade-supporting beam 5 provided at its front end with a vertical slot formed at right angles thereto for the reception of the pivotal bolt 55, pivotal bolt 55 rigidly fixed at one end to said frame and having pivotal bearings in said vertical slot; link 26 communicating between the arm 25 of said operating-lever and said beam, said link being adapted to serve the twofold purpose of communicating a vertical movement from the operating-lever 24 of the front end of said beam as said operating-lever is moved and as a means of holding the front end of said lever at a fixed point as its rear end is raised by contact with an uneven surface, flexible connection 30 communicating from arm 29 of the operating-lever 24 over the pulley 31 with the rear end of said beam all substantially as and for the purpose specified.

In testimony whereof I affix my signature in the presence of two witnesses.

JAMES P. BRENNAN.

Witnesses:
ELSIE KOPPLIN,
M. G. WEILEMANN.